(12) United States Patent
Fujita

(10) Patent No.: US 12,480,680 B2
(45) Date of Patent: Nov. 25, 2025

(54) OUTSIDE AIR TREATMENT DEVICE AND AIR CONDITIONING SYSTEM

(71) Applicant: DAIKIN INDUSTRIES, LTD., Osaka (JP)

(72) Inventor: Naotoshi Fujita, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 920 days.

(21) Appl. No.: 17/541,008

(22) Filed: Dec. 2, 2021

(65) Prior Publication Data

US 2022/0090813 A1 Mar. 24, 2022

Related U.S. Application Data

(63) Continuation of application No. PCT/JP2020/019252, filed on May 14, 2020.

(30) Foreign Application Priority Data

Jun. 26, 2019 (JP) .................................. 2019-118717

(51) Int. Cl.
*F24F 11/65* (2018.01)
*F24F 6/00* (2006.01)
(Continued)

(52) U.S. Cl.
CPC ................ *F24F 11/65* (2018.01); *F24F 6/00* (2013.01); *F24F 11/0008* (2013.01);
(Continued)

(58) Field of Classification Search
CPC .......... F24F 11/65; F24F 6/00; F24F 11/0008; F24F 11/46; F24F 11/74;
(Continued)

(56) References Cited

U.S. PATENT DOCUMENTS 5,303,561 A * 4/1994 Bahel ..................... F24F 11/77
62/186
5,950,442 A * 9/1999 Maeda .................... F24F 5/001
62/332
(Continued)

FOREIGN PATENT DOCUMENTS

JP 9-329371 A 12/1997
JP 2002-317997 A 10/2002
(Continued)

OTHER PUBLICATIONS

Extended European Search Report for European Application No. 20830571.4, dated Sep. 16, 2022.
(Continued)

*Primary Examiner* — Edelmira Bosques
*Assistant Examiner* — Frances F. Hamilton
(74) *Attorney, Agent, or Firm* — Birch, Stewart, Kolasch & Birch, LLP

(57) ABSTRACT

An outside air processing device adjusts the temperature and humidity of outside air taken thereinto, and then supplies the adjusted air to a target space. The outside air processing device includes a heating element configured to heat air, a humidifying element configured to humidify air that has passed through the heating element, and a control unit for outside air processing configured to change the temperature of air at an inlet of the humidifying element in accordance with the humidity in the target space.

7 Claims, 1 Drawing Sheet

(51) Int. Cl.
  *F24F 11/00* (2018.01)
  *F24F 11/46* (2018.01)
  *F24F 11/74* (2018.01)
  *F24F 110/70* (2018.01)
  *F24F 140/50* (2018.01)
  *F24F 140/60* (2018.01)

(52) U.S. Cl.
  CPC .............. *F24F 11/46* (2018.01); *F24F 11/74* (2018.01); *F24F 2011/0002* (2013.01); *F24F 2110/70* (2018.01); *F24F 2140/50* (2018.01); *F24F 2140/60* (2018.01)

(58) Field of Classification Search
  CPC ........... F24F 2011/0002; F24F 2110/70; F24F 2140/50; F24F 2140/60
  USPC ........................................................ 454/256
  See application file for complete search history.

(56) References Cited

U.S. PATENT DOCUMENTS

| | | | | |
|---|---|---|---|---|
| 2004/0108388 | A1* | 6/2004 | Wacker | F24F 11/74 236/44 C |
| 2014/0349563 | A1* | 11/2014 | Honda | F24F 1/0035 454/256 |
| 2015/0192315 | A1* | 7/2015 | Marik | F24F 11/64 700/275 |
| 2015/0338114 | A1* | 11/2015 | Bauer | F24F 11/64 454/338 |
| 2015/0362200 | A1* | 12/2015 | Hamada | F25B 49/022 62/175 |
| 2018/0313562 | A1* | 11/2018 | Kimura | F24F 3/001 |
| 2019/0086113 | A1 | 3/2019 | Horie et al. | |
| 2019/0293319 | A1* | 9/2019 | Okeya | F24F 11/83 |
| 2020/0080742 | A1* | 3/2020 | Okamoto | G05B 17/02 |
| 2020/0200413 | A1* | 6/2020 | Horie | F24F 11/0008 |

FOREIGN PATENT DOCUMENTS

| | | | | |
|---|---|---|---|---|
| JP | 2006-14507 | A | | 6/2006 |
| JP | 2006-343038 | A | | 12/2006 |
| JP | 2007-285539 | A | | 11/2007 |
| JP | 2017-36911 | A | | 2/2017 |
| KR | 20130120601 | A | * | 11/2013 |
| KR | 101769454 | B1 | * | 8/2017 |
| WO | WO 2009/044855 | A1 | | 4/2009 |
| WO | WO 2017/212582 | A1 | | 12/2017 |
| WO | WO 2018/109844 | A1 | | 6/2018 |
| WO | WO 2018/182022 | A1 | | 10/2018 |
| WO | WO-2019008694 | A1 | * | 1/2019 .......... F24F 11/0008 |
| WO | WO-2020065929 | A1 | * | 4/2020 |

OTHER PUBLICATIONS

English translation of the International Preliminary Report on Patentability and Written Opinion of the International Searching Authority for International Application No. PCT/JP2020/019252, dated Jan. 6, 2022.
International Search Report (PCT/ISA/210) issued in PCT/JP2020/019252 mailed on Aug. 11, 2020.
Written Opinion (PCT/ISA/237) issued in PCT/JP2020/019252 mailed on Aug. 11, 2020.

* cited by examiner

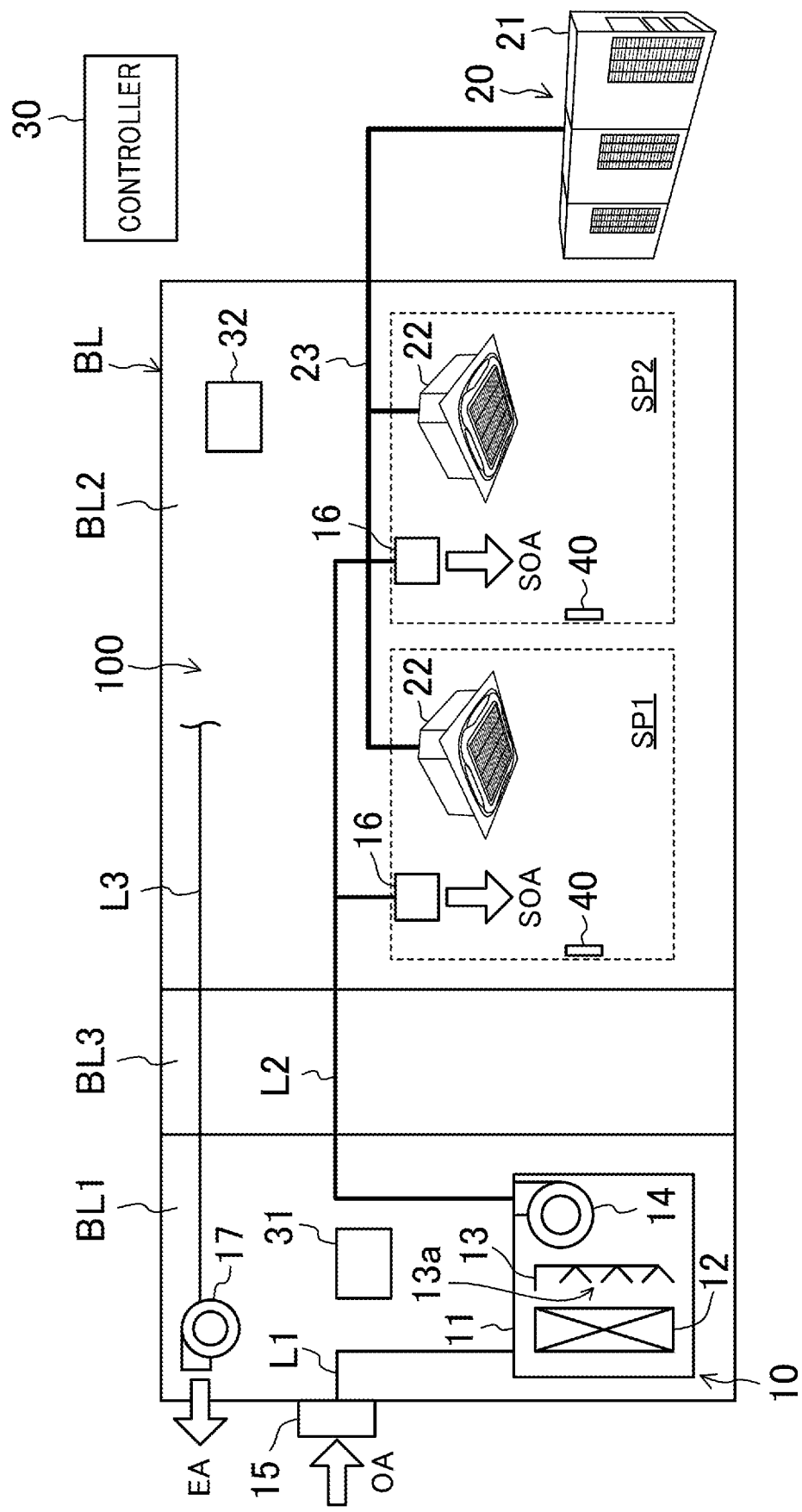

OUTSIDE AIR TREATMENT DEVICE AND AIR CONDITIONING SYSTEM

CROSS REFERENCE TO RELATED APPLICATIONS

This application is a Continuation of PCT International Application No. PCT/JP2020/019252, filed on May 14, 2020, which claims priority under 35 U.S.C. 119 (a) to Patent Application No. 2019-118717, filed in Japan on Jun. 26, 2019, all of which are hereby expressly incorporated by reference into the present application.

TECHNICAL FIELD

The present disclosure relates to an outside air processing device and an air-conditioning system.

BACKGROUND ART

An air-conditioning system that has been used includes an outside air processing device and an air-conditioning device. The outside air processing device heats or cools outside air, and supplies the heated or cooled air to a target space, thereby ventilating or air-conditioning the target space. The air-conditioning device heats or cools air in the target space (inside air), and sends the heated or cooled air to the target space, thereby conditioning the air in the target space.

An outside air processing device of a known air-conditioning system performs supply air temperature control to make the temperature of the supply air close to a set value and airflow rate control to make the carbon dioxide concentration in an indoor space close to a set value. An air-conditioning device of the known system performs indoor temperature control to make the indoor temperature close to a set value.

CITATION LIST

Patent Document

Patent Document 1: Japanese Unexamined Patent Publication No. 2006-343038

SUMMARY

A first aspect of the present disclosure is directed to an outside air processing device configured to adjust a temperature and humidity of outside air taken into the outside air processing device and to supply the outside air to a target space (SP1, SP2). The outside air processing device includes: a heating element (12) configured to heat air; a humidifying element (13) configured to humidify air that has passed through the heating element (12); and a control unit (31) for outside air processing, the control unit (31) being configured to change a temperature of air at an inlet (13a) of the humidifying element (13) in accordance with a humidity in the target space (SP1, SP2).

BRIEF DESCRIPTION OF THE DRAWING

FIG. 1 illustrates an exemplary configuration of an air-conditioning system according to an embodiment.

DESCRIPTION OF EMBODIMENTS

Embodiments of the present disclosure will be described below with reference to the drawings. The embodiments below are merely exemplary ones in nature, and are not intended to limit the scope, applications, or use of the invention.

<Configuration of Air-Conditioning System>

FIG. 1 illustrates an exemplary configuration of an air-conditioning system (100) according to an embodiment. The air-conditioning system (100) achieves air conditioning in a target space included in a structure, such as a house, a building, a factory, or a public facility.

In this embodiment, the air-conditioning system (100) is used for a building (BL) including a plurality of (for example, two) target spaces (SP1, SP2). The target spaces (SP1) and (SP2) may be separate indoor spaces or different spaces in the same room. The building (BL) includes a machine chamber (BL1) where an outside air processing device (10) described below is disposed, an exclusively owned section (BL2) including the target spaces (SP1, SP2), and a corridor (BL3) interposed between the machine chamber (BL1) and the exclusively owned section (BL2).

As illustrated in FIG. 1, the air-conditioning system (100) includes the outside air processing device (10), an air-conditioning device (20), and a controller (30). The outside air processing device (10) adjusts the temperature and humidity of outside air (OA) taken thereinto, and then supplies the adjusted air to the target spaces (SP1, SP2). The outside air (OA) is air outside the target spaces (SP1, SP2), and is air outside the building (BL) in this embodiment. The air-conditioning device (20) adjusts the temperatures of air in the target spaces (SP1, SP2), i.e., inside air (IA).

In the air-conditioning system (100), entering commands into remote controls (40) respectively installed in the target spaces (SP1, SP2) as appropriate triggers a change in the operating states of the outside air processing device (10) and the air-conditioning device (20). The controller (30) controls the operating states of the outside air processing device (10) and the air-conditioning device (20) in accordance with the commands entered into the remote controls (40) (commands related to start/stop, the type of operation, the set temperature, the set airflow rate, and other elements) and the temperatures, humidities, and other parameters of outside air (OA) and inside air (IA).

<Configuration of Outside Air Processing Device>

The outside air processing device (10) includes, as main components, an air handling unit (11) and a chiller unit (not shown) serving as a heat source unit. The air handling unit (11) may be a water-operated air handling unit or a refrigerant-operated air handling unit (a direct expansion air handling unit).

The outside air processing device (10) in operation takes outside air (OA) from an intake port (15) formed in an outer wall of the building (BL) through an intake duct (L1) into the air handling unit (11), cools or heats, or dehumidifies or humidifies, the taken air, and supplies the resultant air as supply air (SOA) through an air supply duct (L2) and air supply ports (16) to the target spaces (SP1, SP2).

The outside air processing device (10) uses an exhaust fan (17) to release exhaust air (EA) from exhaust ports (not shown) of the target spaces (SP1, SP2) through an exhaust duct (L3) to the outside of the building (BL).

The air handling unit (11) includes, as main components, a heating element (12), a humidifying element (13), and an airflow rate adjusting element (14). The heating element (12) is an outside air heat exchanger that functions as a heater and/or cooler for the outside air (OA), and includes heat transfer tubes and heat transfer fins. The outside air heat exchanger exchanges heat between outside air (OA) passing through an area surrounding the heat transfer tubes and the heat transfer fins and a heating medium passing through the heat transfer tubes. The humidifying element (13) humidifies the outside air (OA) that has passed through the heating element (12). The system and model of the humidifying element (13) are not specifically limited. For example, a typical natural evaporation (vaporizing) humidifier may be used. The airflow rate adjusting element (14) is a fan used to take outside air (OA) into the air handling unit (11) and to send the taken air to the air supply duct (L2). The model of the fan is not specifically limited. For example, an air supply fan, such as a sirocco fan, may be used. The airflow rate adjusting element (14) includes a fan motor, which is controlled by an inverter to adjust the number of revolutions of the fan motor. In other words, the airflow rate adjusting element (14) adjusts the flow rate of air processed, which is the flow rate of air to be supplied to the target spaces (SP1, SP2).

The air handling unit (11) includes various sensors, such as an outside-air temperature sensor and an outside-air humidity sensor that respectively detect the temperature and humidity of outside air (OA) sucked into the air handling unit (11), and a supply-air temperature sensor that detects the temperature of supply air (SOA) sent to the air supply duct (L2) (i.e., the target spaces (SP1, SP2)).

The air supply duct (L2) is a member that forms a flow path for outside air (OA). The air supply duct (L2) has its one end connected to the air handling unit (11) so that the airflow rate adjusting element (14) driven allows outside air (OA) to flow into the air supply duct (L2). The other end of the air supply duct (L2) branches into a plurality of branches, and communicates with the target spaces (SP1, SP2) at respective destinations of the branches. Specifically, the other end (respective destinations of the branches) of the air supply duct (L2) is connected to the air supply ports (16) formed in the ceilings of the target spaces (SP1, SP2).

The outside air processing device (10) has a control unit (31) for outside air processing. The control unit (31) for outside air processing controls operations of components included in the outside air processing device (10). The control unit (31) for outside air processing includes a central processing unit (CPU), a memory, and various electric components. The control unit (31) for outside air processing is connected to devices included in the outside air processing device (10) through wires. The control unit (31) for outside air processing is electrically connected to the controller (30) and the remote controls (40) through communication lines. In this embodiment, the control unit (31) for outside air processing is configured by electrically connecting microcomputers and associated electric components which are arranged in the air handling unit (11) or the chiller unit (not shown).

The control unit (31) for outside air processing sets a target value of the supply air temperature in accordance with the set temperature, the supply air temperature, and other parameters, and adjusts operations of the components as appropriate based on the target value. The operating capacity (air conditioning capacity) of the outside air processing device (10) is changed as appropriate in this manner. The target value of the supply air temperature may be set by the controller (30).

<Configuration of Air-Conditioning Device>

The air-conditioning device (20) includes a refrigerant circuit. A refrigerant is circulated through the refrigerant circuit to perform a vapor compression refrigeration cycle, thereby achieving air conditioning, such as cooling, dehumidification, or heating of the target spaces (SP1, SP2). The air-conditioning device (20) has a plurality of operating modes, and operates in accordance with the operating modes. Specifically, the air-conditioning device (20) performs operations, such as a cooling operation for cooling, a dehumidifying operation for dehumidification, and a heating operation for heating.

The air-conditioning device (20) includes, as main components, a single outdoor unit (21) serving as a heat source unit, and a plurality of (e.g., two) indoor units (22). The model of the air-conditioning device (20) is not specifically limited. For example, a variable refrigerant volume (VRV) air-conditioning device may be used.

The air-conditioning device (20) has its outdoor unit (21) and its indoor units (22) connected together via a connection pipe (23) to form a refrigerant circuit. The refrigerant enclosed in the refrigerant circuit is not specifically limited. For example, a hydrofluorocarbon (HFC) refrigerant, such as a refrigerant R32 or R410A, may be used.

The outdoor unit (21) is disposed outside the target spaces (SP1, SP2), and is disposed outside the building (BL) in this embodiment. Although not shown, the outdoor unit (21) includes, as main components, a compressor, a four-way switching valve, an outdoor heat exchanger, and an outdoor fan. The compressor compresses a low-pressure refrigerant in the refrigeration cycle to a high-pressure refrigerant. The four-way switching valve is a flow path switching means configured to change the flow direction of the refrigerant in the refrigerant circuit. The outdoor heat exchanger exchanges heat between an air flow passing therethrough (an outdoor air flow produced by the outdoor fan) and the refrigerant. The outdoor heat exchanger functions as a condenser or a radiator for the refrigerant in a normal cycle of operation (the cooling operation and the dehumidifying operation), and as an evaporator for the refrigerant in a reverse cycle of operation (the heating operation). The outdoor fan produces an outdoor air flow. The outdoor air flow is a flow of outside air that flows into the outdoor unit (21), passes through the outdoor heat exchanger, and flows out of the outdoor unit (21). The outdoor air flow is a cooling source of the refrigerant in the outdoor heat exchanger during the normal cycle of operation, and is a heating source of the refrigerant in the outdoor heat exchanger during the reverse cycle of operation. The outdoor fan includes a fan motor, which is controlled by an inverter to adjust the number of revolutions of the fan motor. That is, the outdoor fan can change the airflow rate.

The outdoor unit (21) includes various sensors, such as a suction pressure sensor configured to detect the pressure of the refrigerant sucked into the compressor and a discharge pressure sensor configured to detect the pressure of the refrigerant discharged from the compressor.

The indoor units (22) are disposed in the corresponding target spaces (SP1, SP2). Specifically, in this embodiment, the two indoor units (22) are connected in parallel to the single outdoor unit (21). The model of each indoor unit (22) is not specifically limited. For example, the indoor unit (22) may be a ceiling-mounted indoor unit mounted on the ceiling of the associated target space (SP1, SP2). In this case, each indoor unit (22) is installed in the associated target space (SP1, SP2) such that its inlet and outlet are exposed from the ceiling.

Although not shown, each indoor unit (22) includes an indoor heat exchanger, an expansion valve, and an indoor fan. The indoor heat exchanger exchanges heat between an air flow passing therethrough (an indoor air flow produced by the indoor fan) and the refrigerant. The indoor heat exchanger functions as an evaporator for the refrigerant in the normal cycle operation, and as a condenser or a radiator for the refrigerant in the reverse cycle of operation. The expansion valve is a valve that functions as a pressure reducer or a flow rate adjuster for the refrigerant, such as an electric expansion valve capable of controlling its opening degree, and is disposed between the indoor heat exchanger and a liquid-side connection pipe. The indoor fan produces an indoor air flow. The indoor air flow is a flow of inside air that flows into the indoor unit (22), passes through the indoor heat exchanger, and flows out of the indoor unit (22). The indoor air flow is a heating source of the refrigerant in the indoor heat exchanger during the normal cycle of operation, and is a cooling source of the refrigerant in the indoor heat exchanger during the reverse cycle of operation. The indoor fan includes a fan motor, which is controlled by an inverter to adjust the number of revolutions of the fan motor. That is, the indoor fan can change the airflow rate.

Each indoor unit (22) includes various sensors, such as an indoor temperature sensor, an indoor humidity sensor, and a carbon dioxide concentration sensor configured to detect the temperature, humidity, and carbon dioxide concentration, respectively, of an indoor air flow (inside air) sucked into the indoor unit (22), and a refrigerant temperature sensor configured to detect the temperature of the refrigerant in the indoor heat exchanger.

The air-conditioning device (20) has a control unit (32) for air conditioner. The control unit (32) for air conditioner controls operations of components included in the air-conditioning device (20). The control unit (32) for air conditioner includes a CPU, a memory, and various electric components. The control unit (32) for air conditioner is connected to components included in the air-conditioning device (20) through wires. The control unit (32) for air conditioner is electrically connected to various sensors arranged in each indoor unit (22). The control unit (32) for air conditioner is communicably connected to the remote controls (40) installed in the respective target spaces (SP1, SP2). The control unit (32) for air conditioner is electrically connected to the controller (30) and the remote controls (40) through communication lines.

In this embodiment, the control unit (32) for air conditioner is configured by electrically connecting microcomputers and associated electric components that are arranged in the outdoor unit (21) and the indoor units (22). The control unit (32) for air conditioner sets a target value of the evaporation temperature in the outdoor unit (21) in accordance with the circumstances, such as the set temperature and the indoor temperature, and adjusts the capacity of the compressor, the airflow rate of the outdoor fan, and other parameters as appropriate based on the target value. The operating capacity (air conditioning capacity) of the air-conditioning device (20) is changed as appropriate in this manner. The target value of the evaporation temperature may be set by the controller (30).

<Controller and Remote Control>

The controller (30) is a functional unit that controls an operation of the air-conditioning system (100) as a whole. Specifically, the controller (30) includes a computer including a memory, a CPU, and the like. The computer executes a program to perform the functions of the air-conditioning system (100). The program is recorded in a computer-readable recording medium, such as a read only memory (ROM).

The controller (30) is electrically connected to the control unit (31) for outside air processing and the control unit (32) for air conditioner, and transmits and receives signals to and from these units. The controller (30) transmits a predetermined signal (e.g., a control signal for setting a target supply air temperature or a target evaporation temperature) to the control unit (31) for outside air processing and the control unit (32) for air conditioner, thereby making it possible to control operations of components that constitute the outside air processing device (10) and the air-conditioning device (20). The controller (30) receives a predetermined signal transmitted from each of the control unit (31) for outside air processing and the control unit (32) for air conditioner, thereby making it possible to acquire detection values of various sensors disposed in the outside air processing device (10) and the air-conditioning device (20), and information determining the operating states of the outside air processing device (10) and the air-conditioning device (20).

The remote controls (40) are input devices to which a user inputs various commands for changing the operating states (start/stop, the type of operation, the set temperature, the set humidity, the set airflow rate, and other parameters) of the outside air processing device (10) and the air-conditioning device (20) individually. Each of the remote controls (40) also functions as a display for displaying predetermined information (such as the operating states of the outside air processing device (10) and the air-conditioning device (20) and the temperatures and humidities of inside air and outside air).

<Humidity Control by Outside Air Processing Device>

The outside air processing device (10) and air-conditioning device (20) of the air-conditioning system (100) each have a separate heat source. When both of the outside air processing device (10) and the air-conditioning device (20) are performing the cooling operation (which may be dehumidification) or heating operation (which may be humidification), the outside air processing device (10) undergoes supply air temperature control, and the cooling capacity or the heating capacity of the air-conditioning device (20) is adjusted in accordance with the loads in the target spaces (SP1, SP2).

In a known air-conditioning system that is a combination of an outside air processing device and an air-conditioning device, these devices are basically controlled independently of each other. The outside air processing device is activated or deactivated based on the conditions of outside air, and the air-conditioning device is activated or deactivated based on the conditions of indoor temperature.

In contrast, the control unit (31) for outside air processing of the outside air processing device (10) of this embodiment controls the humidities in the target spaces (SP1, SP2) by changing the temperature of air at the inlet (13a) of the humidifying element (13) in accordance with the humidities in the target spaces (SP1, SP2). Suppose that the humidifying element (13) is, for example, a vaporizing humidifier. In this case, while increasing the temperature of the air at the inlet (13a) can lead to an increase in the amount of humidification, reducing the temperature of the air at the inlet (13a) can lead to a reduction in the amount of humidification.

Whether the humidity in each of the target spaces (SP1, SP2) (hereinafter referred to as the "indoor humidity") is high, low, or appropriate may be determined as follows, for example. The indoor humidity is determined based on a predetermined value a (e.g., a relative humidity (RH) of 10%) to be "low" if the indoor humidity is lower than "set humidity−α," to be "high" if the indoor humidity is higher than "set humidity+α," and to be "appropriate" if the indoor humidity is within the range from "set humidity−α" to "set humidity+α." The humidity may be either an absolute humidity or a dewpoint temperature.

The control unit (31) for outside air processing may change the target value of the temperature of the supply air to be supplied to the target spaces (SP1, SP2) to change the temperature of the air at the inlet (13a) of the humidifying element (13). In this case, the control unit (31) for outside air processing may set at least either the target value of the supply air temperature or the flow rate of air processed to reduce the consumed power, such as the sum of power consumed by the outside air processing device (10) and power consumed by the air-conditioning device (20).

The control unit (31) for outside air processing or the controller (30) may calculate the power consumed by the outside air processing device (10) based on a previously defined calculation formula for the power consumed by the outside air processing device (10) and in accordance with the conditions of outside air, the operating conditions of the outside air processing device (10), and other parameters. The control unit (32) for air conditioner or the controller (30) may calculate the power consumed by the air-conditioning device (20) based on a previously defined calculation formula for the power consumed by the air-conditioning device (20) and in accordance with the conditions of inside air, the operating conditions of the air-conditioning device (20), and other parameters.

The control unit (31) for outside air processing may set the target value of the supply air temperature in accordance with the humidities in the target spaces (SP1, SP2), and may set the flow rate of air processed in accordance with the carbon dioxide concentrations in the target spaces (SP1, SP2).

If the humidities in the target spaces (SP1, SP2) are lower than a predetermined humidity, and the heating load of the air-conditioning device (20) is higher than a predetermined load, the control unit (31) for outside air processing may set the target value of the supply air temperature to be high. In this case, when the target value of the supply air temperature reaches a predetermined upper limit, the control unit (31) for outside air processing may increase the flow rate of air processed.

An index indicating the heating load of the air-conditioning device (20) may be, for example, the "load factor (the ratio of the load to the rated capacity)," the operating ratio (the ratio of the number of thermostatically activated indoor units to the total number of indoor units), or the "difference of the indoor temperature from the set temperature." Suppose that a predetermined value (a reference value) of the load factor is, for example, 20%. In this case, if the load factor exceeds 20%, the load is determined to be "high," and if the load factor is less than 20%, the load is determined to be "low." Suppose that a predetermined value (a reference value) of the operating ratio is, for example, 50%. In this case, if the operating ratio exceeds 50%, the load is determined to be "high," and if the operating ratio is less than 50%, the load is determined to be "low." Suppose that a predetermined value (a reference value) of the difference of the indoor temperature from the set temperature is, for example, "set temperature+1° C.," and that the set temperature is 20° C. In this case, if the indoor temperature is lower than 21° C., the load is determined to be "high," and if the indoor temperature exceeds 21° C., the load is determined to be "low."

If the humidities in the target spaces (SP1, SP2) are lower than the predetermined humidity, and the heating load of the air-conditioning device (20) is equal to or lower than the predetermined load, the control unit (31) for outside air processing may increase the flow rate of air processed. In this case, if the increase in the flow rate of air processed causes a cooling load on the air-conditioning device (20), the control unit (31) for outside air processing may increase the flow rate of air processed, and may set the target value of the supply air temperature to be low.

If the target value of the supply air temperature is set to be low while the flow rate of air processed is increased, the flow rate of air processed and the target value of the supply air temperature are set so that the "decrement of the amount of humidification resulting from a reduction in the target value of the supply air temperature" is less than the "increment of the amount of humidification resulting from an increase in the flow rate of air processed." Meanwhile, the flow rate of air processed and the target value of the supply air temperature may be set using the relationship "the amount of humidification ∝ the flow rate of air processed×(the supply air temperature−A (a variable determined by operating conditions))."

If the target value of the supply air temperature is set to be low while the flow rate of air processed is increased, the flow rate of air processed and the target value of the supply air temperature are set so that the value obtained by subtracting the "decrement of the heating capacity of the outside air processing device (10) resulting from a reduction in the target value of the supply air temperature" from the "increment of the heating capacity of the outside air processing device (10) resulting from an increase in the flow rate of air processed" is less than the "heating load of the air-conditioning device (20)." Meanwhile, after the current value of each of the heating capacity of the outside air processing device (10) and the heating load of the air-conditioning device (20) has been acquired from the associated device, the flow rate of air processed and the target value of the supply air temperature may be set using the relationship "the heating capacity of the outside air processing device (10) ∝ the flow rate of air processed×(the supply air temperature−B (a variable determined by operating conditions))."

Advantages of Embodiment

A humidifier of a known outside air processing device is selected based on its rated airflow rate. This is why no consideration is originally given to lack of humidification caused by a reduction in the amount of ventilation. If the humidity is to be maintained, the flow rate of air processed needs to be maintained. The known outside air processing device controls the amount of ventilation based on the carbon dioxide concentration or any other parameter for the purpose of energy conservation. Thus, an increase in the amount of humidification triggered by an increase in the flow rate of air processed, which results in an increase in energy consumption, is not suitable for this purpose.

In contrast, the outside air processing device (10) of this embodiment includes the heating element (12) configured to heat air, the humidifying element (13) configured to humidify air that has passed through the heating element (12), and the control unit (31) for outside air processing, the control unit (31) being configured to change the temperature of air at the inlet (13a) of the humidifying element (13) in accordance with the humidities in the target spaces (SP1, SP2). Thus, the control unit (31) for outside air processing can change the temperature of the air at the inlet (13a) of the humidifying element (13) in accordance with the humidities in the target spaces (SP1, SP2) to control humidification. This allows consumed power to be lower than a method in which a decrease in humidity triggers an increase in the airflow rate, and allows humidity control.

For example, if, while a vaporizing humidifier is used as the humidifying element (13) of the outside air processing device (10) to supply outside air for ventilation in small amounts, the target spaces (SP1, SP2) are likely to be insufficiently humidified, simply increasing the temperature of the air at the inlet (13a) of the humidifying element (13) can increase the amount of humidification without increasing the flow rate of air processed (i.e., with the consumed power reduced).

If the control unit (31) for outside air processing of the outside air processing device (10) of this embodiment changes the target value of the temperature of supply air to be supplied to the target spaces (SP1, SP2) to change the temperature of the air at the inlet (13a) of the humidifying element (13), the temperature of the air at the inlet (13a) can be easily changed.

If the outside air processing device (10) of this embodiment further includes the airflow rate adjusting element (14) configured to adjust the flow rate of air processed, which is the flow rate of air to be supplied to the target spaces (SP1, SP2), the increase in the flow rate of air processed by the airflow rate adjusting element (14), for example, can substantially prevent a decrease in the heat source efficiency caused by an excessive increase in the supply air temperature (condensation temperature).

If the control unit (31) for outside air processing of the outside air processing device (10) of this embodiment sets at least either the target value of the supply air temperature or the flow rate of air processed to reduce the consumed power, adjusting the target value of the supply air temperature and the flow rate of air processed in combination can reduce the consumed power.

If the control unit (31) for outside air processing of the outside air processing device (10) of this embodiment sets the target value of the supply air temperature in accordance with the humidities in the target spaces (SP1, SP2), and sets the flow rate of air processed in accordance with the carbon dioxide concentrations in the target spaces (SP1, SP2), controlling the humidities in the target spaces (SP1, SP2) through adjustment of the supply air temperature can reduce the ventilation load.

The air-conditioning system (100) of this embodiment includes the outside air processing device (10) described above, and the air-conditioning device (20) configured to adjust at least the temperatures of air in the target spaces (SP1, SP2). This can provide the advantages described above. Adjusting the supply air temperature of the outside air processing device (10) and the flow rate of air processed by the outside air processing device (10) in accordance with the operating conditions of the air-conditioning device (20) can reduce the consumed power. For example, if the heating load of the air-conditioning device (20) is high, increasing the supply air temperature of the outside air processing device (10) can increase the amount of humidification while reducing the consumed power. If the heating load of the air-conditioning device (20) is low or if a cooling load is placed on the air-conditioning device (20), increasing the flow rate of air processed (outside air, circulation) can increase the amount of humidification while avoiding the increase in the cooling load (mixing loss) caused by the increase in the supply air temperature.

As can be seen from the foregoing description, the air-conditioning system (100) of this embodiment includes the outside air processing device (10) and the air-conditioning device (20) that operate in conjunction with each other to achieve both comfort (humidity control) and energy conservation. The outside air processing device (10) originally controls the temperature of the outside air taken thereinto. In particular, in a situation where only the outside air processing device (10) conditions air, or in any other similar situation, the outside air processing device (10) is not allowed to optionally change the supply air temperature or any other parameter for humidification. However, in this embodiment, the outside air processing device (10) can perform humidity control in accordance with the operating state of the air-conditioning device (20) (indoor units (22)).

If the air-conditioning device (20) of the air-conditioning system (100) of this embodiment is a VRV air-conditioning device (20), the single outdoor unit can control the indoor units individually. This enables appropriate air conditioning for each of rooms (target spaces).

If the control unit (31) for outside air processing of the air-conditioning system (100) of this embodiment sets at least either the target value of the supply air temperature or the flow rate of air processed to reduce the sum of the power consumed by the outside air processing device (10) and the power consumed by the air-conditioning device (20), adjusting the target value of the supply air temperature and the flow rate of air processed in combination can reduce the consumed power.

In the air-conditioning system (100) of this embodiment, if the humidities in the target spaces (SP1, SP2) are lower than the predetermined humidity, and the heating load of the air-conditioning device (20) is higher than the predetermined load, increasing the target value of the supply air temperature by the control unit (31) for outside air processing can provide the following advantages. Specifically, shifting the load (sensible heat capacity) from the air-conditioning device (20) to the outside air processing device (10) can increase only the amount of humidification (latent heat) with the sensible heat capacity of the entire air-conditioning system maintained. In this case, if the amount of humidification is insufficient only by changing the supply air temperature when the target value of the supply air temperature reaches the predetermined supply limit, the amount of humidification can be increased by increasing the flow rate of air processed by using the control unit (31) for outside air processing.

In the air-conditioning system (100) of this embodiment, if the humidities in the target spaces (SP1, SP2) are lower than the predetermined humidity, and the heating load of the air-conditioning device (20) is equal to or lower than the predetermined load, increasing the flow rate of air processed, by the control unit (31) for outside air processing, can provide the following advantages. Specifically, if the heating load of the air-conditioning device (20) is low, and increasing the supply air temperature may cause the cooling load (mixing loss), increasing not the supply air temperature but the flow rate of air processed can increase the amount of humidification while reducing the consumed power. In this case, if the increase in the flow rate of air processed causes a cooling load on the air-conditioning device (20), increasing the flow rate of air processed and reducing the target value of the supply air temperature, by the control unit (31) for outside air processing, can reduce the cooling load on the air-conditioning device (20) caused by the increase in the flow rate of air processed.

Other Embodiments

In the foregoing embodiment, the control unit (31) for outside air processing changes the target value of the temperature of supply air to be supplied to the target spaces (SP1, SP2) to change the temperature of the air at the inlet (13a) of the humidifying element (13). Alternatively, the temperature of the air at the inlet (13a) of the humidifying element (13) may be changed through another method, such as through the use of a dedicated heater.

In the foregoing embodiment, the control unit (31) for outside air processing, the control unit (32) for air conditioner, or the controller (30) calculates the power consumed by each of the outside air processing device (10) and the air-conditioning device (20) based on the previously defined associated calculation formula and in accordance with the conditions of outside air and inside air, the operating conditions of the devices, and other parameters. Alternatively, the power consumed by the outside air processing device (10) and/or the air-conditioning device (20) may be acquired based on a table previously defined according to condition. The power consumed by the outside air processing device (10) and/or the air-conditioning device (20) does not always need to be calculated in real time. The power consumed by each device may be acquired using, for example, a power measuring instrument that directly measures the power consumed by the devices.

In the foregoing embodiment, a case in which the air-conditioning system (100) is used for the building (BL) having two target spaces (SP1, SP2) has been described. However, the environment where the air-conditioning system (100) is installed is not specifically limited. For example, the air-conditioning system (100) may be used for a building having three or more target spaces or for a building having one target space. Here, the number of indoor units (22) may be changed as appropriate in accordance with the number of target spaces. A plurality of indoor units (22) may be arranged in one target space.

In the foregoing embodiment, the outside air processing device (10) includes the single air handling unit (11) and the single chiller unit. However, the numbers of the air handling units (11) and chiller units of the outside air processing device (10) should not be each limited to one, and can be changed as appropriate in accordance with the installation environment and design specifications. In other words, the outside air processing device (10) may include a plurality of air handling units (11) and/or a plurality of chiller units. The number of air handling units (11) does not always have to be equal to that of chiller units.

In the foregoing embodiment, the air-conditioning device (20) includes the single outdoor unit (21) and the two indoor units (22). However, the numbers of the outdoor units (21) and indoor units (22) of the air-conditioning device (20) can be changed as appropriate in accordance with the installation environment and design specifications. In other words, the air-conditioning device (20) may include a plurality of outdoor units (21), or may include three or more indoor units (22) or one indoor unit (22).

In the foregoing embodiment, the VRV air-conditioning device (20) is used. The model of the air-conditioning device (20) is not specifically limited. Instead of the VRV air-conditioning device, a fan coil air-conditioning device (20) may be used.

In the foregoing embodiment, a case in which the indoor units (22) are mounted on the ceilings of the respective target spaces (SP1, SP2) has been described. The model of each indoor unit (22) and how the indoor units (22) are installed should not be specifically limited. Each indoor unit (22) may be, for example, a so-called ceiling-hung, wall-mounted, or floorstanding unit.

The positions at which the various sensors of the air-conditioning system (100) are arranged are not limited to those in the foregoing embodiment, and can be changed as appropriate. For example, the outside-air temperature sensor, the outside-air humidity sensor and/or the supply air temperature sensor do not always have to be arranged on the air handling unit (11), but may be arranged on another unit or independently. For example, the indoor temperature sensor, the indoor humidity sensor and/or the carbon dioxide concentration sensor do not always have to be arranged on each indoor unit (22), but may be arranged on another unit or independently.

In the foregoing embodiment, how the controller (30) is installed has not been specifically described. How the controller (30) is installed can be selected as appropriate. The controller (30) may be disposed, for example, in an administration office of the building (BL), or may be installed in a remote place communicably connected thereto via a wide area network (WAN) or a local area network (LAN). How the controller (30) is configured may also be changed as appropriate. For example, functional units of the controller (30) do not always have to be arranged together, and may be dispersed, and connected together via a communication network to form the controller (30). A plurality of devices (such as a personal computer (PC) and a smartphone) may be connected together to form the controller (30). The controller (30) may be configured by being connected to the control unit (31) for outside air processing and/or the control unit (32) for air conditioner. The functional units of the controller (30) may be replaced with the control unit (31) for outside air processing and/or the control unit (32) for air conditioner. Alternatively, the functional units of the control unit (31) for outside air processing and/or the control unit (32) for air conditioner may be replaced with the controller (30) or another control unit.

In the foregoing embodiment, a case in which the outside air processing device (10) supplies only outside air (OA) as supply air (SOA) has been described. However, a return air flow path may be formed in the outside air processing device (10) so that a mixture of outside air (OA) and inside air (IA) is supplied as supply air (SOA). The mixing ratio of outside air (OA) and inside air (IA) can be changed as appropriate in accordance with the installation environment and design specifications.

In the foregoing embodiment, the outside air processing device (10) is disposed in the machine chamber (BL1). However, the outside air processing device (10) may be installed in the ceiling cavity, under the floor, or on a sidewall, of a target space (SP1, SP2), for example.

In the foregoing embodiment, how the air-conditioning system (100) includes the outside air processing device (10) of a single duct system has been described. However, it goes without saying that the air-conditioning system (100) may be configured in other ways.

While the embodiments and variations have been described above, it will be understood that various changes in form and details can be made without departing from the spirit and scope of the claims. The embodiment, the variation thereof, and the other embodiments may be combined and replaced with each other without deteriorating intended functions of the present disclosure.

INDUSTRIAL APPLICABILITY

The present disclosure is useful for an outside air processing device and an air-conditioning system.

EXPLANATION OF REFERENCES

10 Outside Air Processing Device
11 Air Handling Unit
12 Heating Element

13 Humidifying Element
14 Airflow Rate Adjusting Element
15 Intake Port
16 Air Supply Port
17 Exhaust Fan
20 Air-Conditioning Device
21 Outdoor Unit
22 Indoor Unit
23 Connection Pipe
30 Controller
31 Control Unit For Outside Air Processing
32 Control Unit For Air Conditioner
40 Remote Control
100 Air-Conditioning System
SP1, SP2 Target Space
BL Building
BL1 Machine Chamber
BL2 Exclusive Section
BL3 Corridor
L1 Intake Duct
L2 Air Supply Duct

The invention claimed is:

1. An air-conditioning system, comprising:
an outside air processing device configured to adjust a temperature and humidity of outside air taken into the outside air processing device and to supply the outside air to a target space; and
an air-conditioning device configured to adjust a temperature of inside air in the target space,
the outside air processing device comprising:
a heating element configured to heat the outside air;
a humidifier configured to humidify the outside air that has passed through the heating element;
an airflow rate adjusting element configured to adjust a flow rate of processed air, which is a flow rate of the outside air to be supplied to the target space; and
a controller for outside air processing, the controller comprising processing circuitry that changes a target value of a temperature of the outside air to be supplied to the target space, in accordance with a humidity in the target space to change a temperature of the outside air at an inlet of the humidifier, wherein
the outside air processing device obtains the outside air independently from the air-conditioning device, and
if the humidity in the target space is lower than a predetermined humidity, and a heating load of the air-conditioning device is equal to or lower than a predetermined load, the processing circuitry of the controller for outside air processing increases the flow rate of the processed air.

2. The air-conditioning system of claim 1, wherein the air-conditioning device is a variable refrigerant volume air-conditioning device.

3. The air-conditioning system of claim 1, wherein
if the humidity in the target space is lower than a predetermined humidity, and a heating load of the air-conditioning device is higher than a predetermined load, the processing circuitry of the controller for outside air processing increases the target value of the temperature of the outside air.

4. The air-conditioning system of claim 1, wherein
if an increase in the flow rate of the processed air causes a cooling load on the air-conditioning device, the processing circuitry of the controller for outside air processing increases the flow rate of the processed air, and reduces the target value of the temperature of the outside air.

5. The air-conditioning system of claim 1, wherein
the processing circuitry of the controller for outside air processing sets at least either the target value of the temperature of the outside air or the flow rate of processed air to reduce a sum of power consumed by the outside air processing device and power consumed by the air-conditioning device.

6. The air-conditioning system of claim 5, wherein
if the humidity in the target space is lower than a predetermined humidity, and a heating load of the air-conditioning device is higher than a predetermined load, the processing circuitry of the controller for outside air processing increases the target value of the temperature of the outside air.

7. An air-conditioning system, comprising:
an outside air processing device configured to adjust a temperature and humidity of outside air taken into the outside air processing device and to supply the outside air to a target space; and
an air-conditioning device configured to adjust a temperature of inside air in the target space,
the outside air processing device comprising:
a heating element configured to heat the outside air;
a humidifier configured to humidify the outside air that has passed through the heating element;
an airflow rate adjusting element configured to adjust a flow rate of processed air, which is a flow rate of outside air to be supplied to the target space; and
a controller for outside air processing, the controller comprising processing circuitry that changes a target value of a temperature of the outside air to be supplied to the target space, in accordance with a humidity in the target space to change a temperature of the outside air at an inlet of the humidifier, wherein
the outside air processing device obtains the outside air independently from the air-conditioning device,
if the humidity in the target space is lower than a predetermined humidity, and a heating load of the air-conditioning device is higher than a predetermined load, the processing circuitry of the controller for outside air processing increases the target value of the temperature of the outdoor air, and
if the target value of the temperature of the outside air reaches a predetermined upper limit, the processing circuitry of the controller for outside air processing increases the flow rate of the processed air.

* * * * *